(12) United States Patent
Lin et al.

(10) Patent No.: US 8,600,908 B2
(45) Date of Patent: Dec. 3, 2013

(54) CARRIER SELECTION METHOD FOR LOGISTICS NETWORK

(75) Inventors: Yi-Kuei Lin, Taipei (TW); Cheng-Ta Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 166 days.

(21) Appl. No.: 12/926,384

(22) Filed: Nov. 15, 2010

(65) Prior Publication Data

US 2012/0016804 A1 Jan. 19, 2012

(30) Foreign Application Priority Data

Jul. 16, 2010 (TW) .............................. 99123526 A

(51) Int. Cl.
*G06F 17/00* (2006.01)
(52) U.S. Cl.
USPC .......................................................... 705/334
(58) Field of Classification Search
USPC .......................................................... 705/334
See application file for complete search history.

(56) References Cited

U.S. PATENT DOCUMENTS

| 2002/0095393 | A1* | 7/2002 | McHaney ........................ 706/13 |
| 2008/0037536 | A1* | 2/2008 | Padmanabhan et al. ...... 370/389 |
| 2009/0192864 | A1* | 7/2009 | Song et al. ........................ 705/9 |

* cited by examiner

*Primary Examiner* — John Hayes
*Assistant Examiner* — David J Clark
(74) *Attorney, Agent, or Firm* — Bacon & Thomas, PLLC

(57) ABSTRACT

A carrier selection method for the logistics network is disclosed to evaluate the network reliability of each carrier set for choosing an optimal carrier set. The logistics network includes a start, a terminal and a plurality of routes between the start and the terminal, and a plurality of minimal paths are composed of the routes. The carrier set is composed of carriers chosen in every route of the logistics network. The carrier selection method includes the steps of choosing one carrier for transporting; distributing a demand in the minimal paths, and each carrier having a plurality of capacities and a maximal capacity; calculating a network reliability for the carrier set transporting the demand in the minimal paths according to the demand, the capacities and the maximal capacity; and executing genetic algorithm for searching an optimal carrier set.

6 Claims, 5 Drawing Sheets ns, which form a part hereof, and in which is shown by way of illustration specific embodiments in which the invention may be practiced.

CARRIER SELECTION METHOD FOR LOGISTICS NETWORK

BACKGROUND OF THE INVENTION (1) Field of the Invention

The invention relates to a carrier selection method for logistics network, and especially relates to a carrier selection method for logistics network with an maximal network reliability.

(2) Description of the Prior Art

With the growth of the globalization, many global enterprises expend their market areas in the world and execute the outsourcing of the logistics activities to external carriers. Therefore, a carrier plays an important role in the global logistics and has influence on the cost, the profit, and the service level in supply chain. The conventional carrier selection methods are based on total cost or total profit criterion, and the carrier's capacity such as the numbers of the containers in the convention is set to be deterministic.

However, the capacity provided by the carrier is stochastic since the capacity may be partially reserved by other orders. In other words, any carrier should have multiple available capacities with a probability distribution. Especially, the logistics network includes the land routes, the ocean routes and the air routes, so the capacities of the carriers corresponding to several routs are different. In other words, when the freight travels through several routs, the corresponding consumption of the capacity is different. A carrier selection or a carrier set, is called, means that the enterprise selects exact one carrier on each of the routes to implement the freight delivery, and the logistics network according to the carrier selection is called as a stochastic logistic network (SLN). The network reliability is a performance index of the freight delivery and is defined as the probability that the specific demand of the commodity are successfully transported from a supplier to a customer.

Hence, how to select one carrier set with the maximal network reliability to provide the stabilization of the freight delivery, to obtain the reliability of the commodity transport, to decrease the costs and to increase the earnings is an important issue.

SUMMARY OF THE INVENTION

Accordingly, the object of the invention is to provide a carrier selection method to offer the stabilization of the freight delivery, to decrease the costs and to increase the earnings.

In one aspect, the invention provides a carrier selection method for a logistics network. The logistics network comprises a plurality of carrier sets having a plurality of carriers, a start, a terminal and a plurality of routes between the start and the terminal, the routes formed as a plurality of minimal paths. The carrier selection method is applied for finding the optimal carrier set with a maximal network reliability from the carrier sets.

The carrier selection method for a logistics network includes the steps of: choosing exact one carrier through each of the routes to form the carrier set for transporting a transmission in the logistics network; distributing a demand of the transmission to the minimal paths, wherein each of the carriers has a plurality of cargo capacities and a maximal capacity; evaluating the network reliability for each of the carrier sets to transport the transmission through the minimal paths according to the demand, the cargo capacities and the maximal capacity; and executing a genetic algorithm to search for the optimal carrier set among the carrier sets, wherein the optimal carrier set has the maximal network reliability.

In an embodiment, the steps of evaluating the network reliability includes: defining a flow vector having a flow of each of minimal paths, wherein the sum of the flows is equal to the demand; selecting the flow vector for satisfying a first constraint, wherein the first constraint is defined that the flow of each of minimal paths is smaller than or equal to the maximal capacity; transforming each of the flow vectors satisfying the first constraint into a corresponding capacity vector, wherein the corresponding capacity vector has a capacity of each of the routes; selecting the capacity vector for satisfying a second constraint, wherein the second constraint is defined that the capacity of one of the routes is equal to the cargo capacity for each of the carriers, so that the capacity vector satisfying the second constraint is defined as a lower vector; and calculating a probability that each of the capacity vectors is lager than or equal to the lower vector, and defining the probability as the network reliability.

In an embodiment, the steps of calculating the network reliability are performed by the minimal path algorithm cooperating with the recursive sum of disjoint products.

In an embodiment, the steps of executing the genetic algorithm includes: defining an initial parameter including a population, a count and a generation number, wherein the population includes a plurality of chromosomes (i.e., carrier sets), and each of the chromosomes represents each of the carrier sets; outputting an optimal solution when the count equaling to the generation number; and defining the optimal solution as the optimal carrier set.

In an embodiment, the steps of executing the genetic algorithm includes: defining an initial parameter including a population, a crossover probability, a mutation probability, a count and a generation number, wherein the population includes a plurality of chromosomes, each of the chromosomes represents each of the carrier sets; adding one to the count when the count smaller than the generation number; executing a roulette wheel selection to select two of the chromosomes; executing a crossover operation based on the crossover probability to change the two chromosomes; executing a mutation operation based on the mutation probability to transform the two chromosomes into two new chromosomes; replacing another two of the chromosomes by the two new chromosomes, wherein the replaced two of the chromosomes have two minimal network reliabilities among the network reliabilities; evaluating the network reliabilities for the two new chromosomes; executing the genetic algorithm again; until the count equaling to the generation number, outputting an optimal solution; and defining the optimal solution as the optimal carrier set.

DESCRIPTION OF THE PREFERRED EMBODIMENTS

Figure 1:
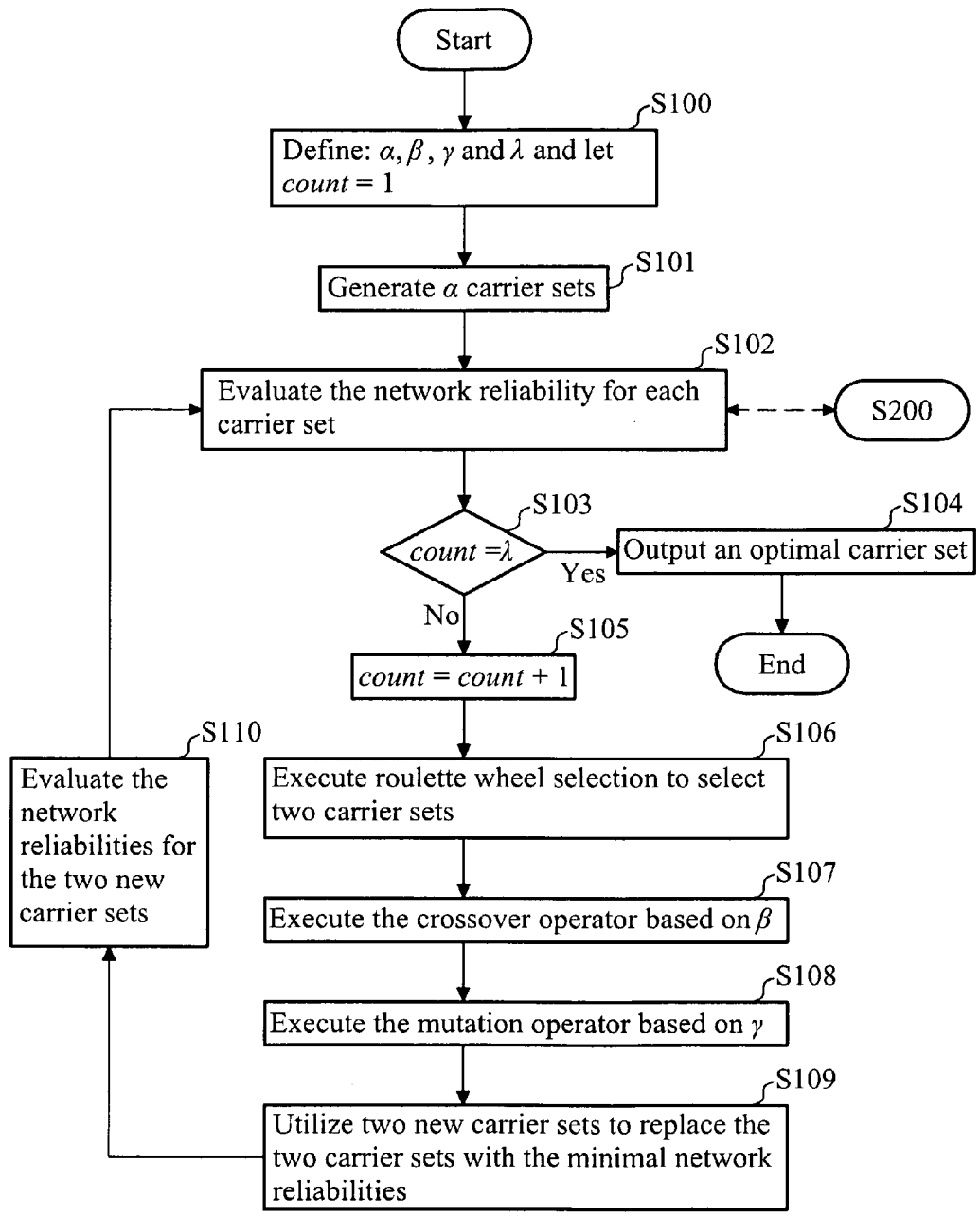
FIG. 1 is a flow chart showing the carrier selection method for logistics network.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The present invention provides a carrier selection method for logistics network. Said method is based on the Genetic algorithm (GA) and combined with the minimal paths (MPs) algorithm and the recursive sum of disjoint products (RSDP) algorithm to evaluate a network reliability for each of multiple carrier sets and to choose the optimal carrier set. Each carrier set is composed of a plurality of carriers. The logistics network includes a start, a terminal and a plurality of routes between the start and the terminal. The routes forms a plurality of minimal paths.

For executing the carrier selection method, a computer is utilized in the present invention to run a carrier selection software. The carrier selection software provides a virtual network to simulate the logistics network. The hardware in the carrier selection method for the logistics network is described as below. The computer has an input unit, an operating unit, a storage unit and an output unit. The input unit is a keyboard or a handwriting input device. The operation unit is a central processing unit (CPU). The storage unit is a hardware electrically connected to the input unit, the operating unit and the output unit. The carrier selection software is installed in the hardware. The output unit is a display or a printer.

Refer to FIG. 1 for a flow chart showing the carrier selection method for the logistics network. The method includes the steps of:

Step (S100): receive a demand, a plurality of cargo capacities $h_{it}(c)$ of each carrier and a maximal capacity $h_{it}(M_{it})$ by a user inputting to the carrier selection software through the input unit. Meanwhile, define the initial parameters, which include a population size $\alpha$, a crossover probability $\beta$, a mutation probability $\gamma$, a count and a generation number, and let count=1 initially. The population includes a plurality of chromosomes, and each chromosome represents a carrier set. Otherwise, add one to the count when executing the genetic algorithm once.

Step (S101): stochastically generate a carrier sets by the operating unit. In other words, select exact one carrier through each of the routes to form a carrier set for transporting a transmission, and distribute the demand of the transmission to the minimal paths.

Step (S102): call the step (S200) to evaluate the network reliability for each of the carrier sets to transport the demand in the minimal paths according to the demand, the cargo capacities and the maximal capacity. In other words, go to the step (S201) then to the step (S208) of FIG. 2 and get the network reliability. Propagate the value of the network reliability back to this step (S102), and go to next step (S103).

Step (S103): execute the genetic algorithm to compare the $\alpha$ carrier sets and then to choose the optimal carrier set with a maximal network reliability. When the count equals to the generation number, i.e., count=$\lambda$, go to the step (S104); otherwise, go to the step (S105).

Step (S104): output an optimal carrier set, and display the optimal carrier set on the output unit.

Step (S105): add one to the count, count=count+1.

Step (S106): execute a roulette wheel selection to select two carrier sets from the $\alpha$ carrier sets and copy them.

Step (S107): execute a crossover operation to exchange the two carrier sets based on the crossover probability $\beta$.

Step (S108): execute a mutation operation to mutate the two carrier sets based on the mutation probability $\gamma$, and transform two new carrier sets from the two carrier sets.

Step (S109): replace another two of the chromosomes by the two new chromosomes, wherein the replaced two of the chromosomes have two minimal network reliabilities among the $\alpha$ carrier sets;

Step (S110): go back to the step (S102) and call the step (S200) to evaluate the network reliability for the two new carrier sets.

Figure 2:
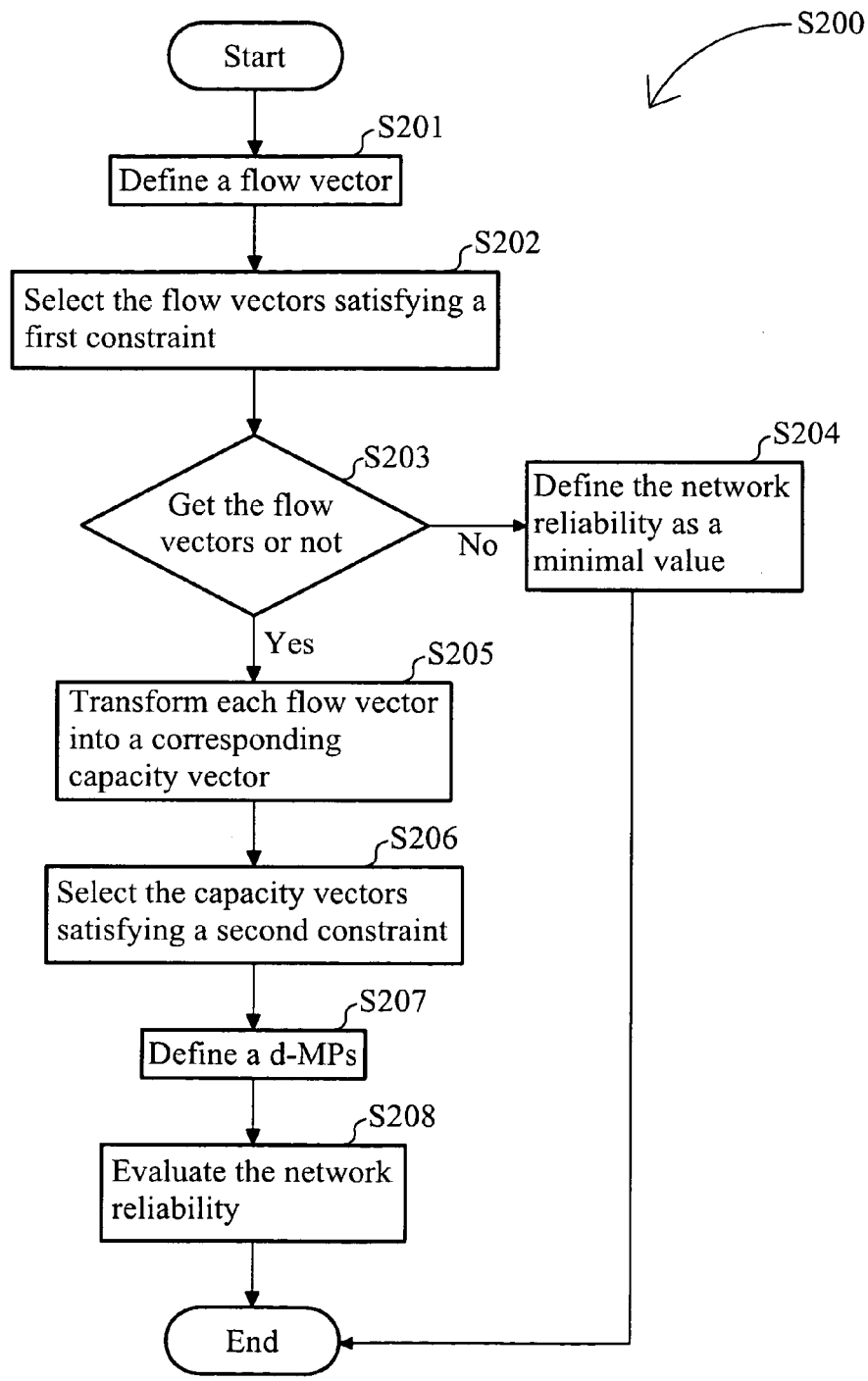
FIG. 2 is a flow chart of evaluating a network reliability for the carrier set.

Refer to FIG. 2, which is the step (S200), for a flow chart of evaluating the network reliability for the carrier set in the step (S102). The steps includes:

Step (201): define a flow vector $F=(f_1, f_2, \ldots f_m)$, which is composed of a flow $f_j$ of each of minimal paths. Wherein the sum of the flows is equal to the demand.

Step (S202): select all the flow vectors F satisfying a first constraint, wherein the first constraint is defined that the flow of each of minimal paths is smaller than or equal to the maximal capacity $h_{it}(M_{it})$;

Step (S203): get the flow vectors or not? Yes for going to the step (S205); no for going to the step (S204).

Step (S204): define the network reliability $R_d$ as a minimal value, and end the step (S200). Propagate the value of the network reliability $R_d$ to the step (S102) of FIG. 1, and go to next step (S103).

Step (S205): transform each of the flow vectors F satisfying the first constraint into a corresponding capacity vector $Y=(y_1, y_2, \ldots y_{n+q})$ by the operating unit. Each capacity vector Y has a capacity of each of the routes.

Step (S206): select the capacity vector for satisfying a second constraint, wherein the second constraint is defined that the capacity of one of the routes is equal to the cargo capacity for each of the carriers.

Step (S207): define the capacity vector Y satisfying the second constraint as a lower vector d-MPs.

Step (S208): calculate a probability for that each of the capacity Y is lager than or equal to the lower vector d-MPs, and define the probability as the network reliability. End the cycle of the step (S200), then propagate the value of the network reliability $R_d$ to the step (S102) of FIG. 1, and go to the next step (S103).

As shown in FIG. 1 and FIG. 2, in virtue of repeatedly choosing exact one carrier through each of the routes to form the carrier set for transporting the transmission, evaluating the network reliability for each of the carrier sets and executing the genetic algorithm, the optimal carrier set with the maximal network reliability is selected among the carrier sets.

In an preferred embodiment, a logistics network, which includes a plurality of air routes and a plurality of land routes, is exemplified. Let $(R_1, R_2, N)$ be the logistics network where N denotes the set of nodes such as cities or transportation centers, $R_1=\{r_i|1\leq i\leq n\}$ denotes the set of n air routes and $R_2=\{r_i|n+1\leq i\leq n+q\}$ denotes the set of q land routes. Otherwise, $p_1, p_2, \ldots, p_m$ denote m minimal paths. On each route $r_i$, there are $z_i$ carriers to be selected. Let $\Omega_i=\{\omega_{it}|1\leq t\leq z_i\}$ be the set of $z_i$ carriers that serve on route $r_i$ for $i=1, 2, \ldots, n+q$, in which $\omega_{it}$ represents the tth carrier on route $r_i$. Each carrier $\omega_{it}$ owns multiple states, $1, 2, \ldots, M_{it}$, with corresponding available cargo capacities: $0=h_{it}(1)<h_{it}(2)<\ldots<h_{it}(M_{it})$ for $t=1, 2, \ldots, z_i$, and the probability in which $h_{it}(c)$ is the cth cargo capacity of the carrier $\omega_{it}$ for $c=1, 2, \ldots, M_{it}$. A chromosome means a carrier set. This integer coding is utilized to represent a chromosome, $G=(g_1, g_2, \ldots, g_{n+q})$ in which $g_i=t$, $t\in\{1, 2, \ldots, z_i\}$ if the carrier $\omega_i$ is assigned to the route $r_i$ for $i=1, 2, \ldots, n+q$. Because this logistics network includes the air routes and the land routes, $\omega_1$ denotes the consumed cargo capacities per unit of the transmission through the air route and $\omega_2$ denotes the consumed cargo capacities per unit of the transmission through the land route.

According to a carrier set G, the logistics network is regarded as a stochastic logistics network (SLN) because each carrier has stochastic cargo capacity. Otherwise, $R_d(G)$ denotes the network reliability, which is a probability, for a carrier set successfully transporting d unit of the commodities from suppliers to customers.

The steps are described below to utilize the genetic algorithm combining the minimal path algorithm and the recursive sum of disjoint products to choose an optimal carrier set among the carrier sets.

Step 1: Define the parameters: the population size $\alpha$, the crossover probability $\beta$, the mutation probability $\gamma$ and the generation number $\lambda$ and let count=1.

Step 2: Generate initial population with a chromosomes by using the integer coding.

Step 3: Evaluate the network reliability for each of the chromosomes as follows.

1. Find all flow vectors F satisfying the following constraints:

$$\left\lceil w_1 \sum_{r_i \in P_j} f_j \right\rceil \leq h_{ig_i}(M_{ig_i}) \text{ for } i = 1, 2, \ldots, n, \quad (1)$$

$$\left\lceil w_2 \sum_{r_i \in P_j} f_j \right\rceil \leq h_{ig_i}(M_{ig_i}) \text{ for } i = n+1, n+2, \ldots, n+q, \text{ and} \quad (2)$$

$$\sum_{j=1}^{m} f_j = d. \quad (3)$$

2. If there is no flow vector F satisfying constraints (1) to (3), a minimal value is assigned to be the network reliability of the chromosome. Then, evaluate next chromosome. In other words, find another carrier set to evaluate its network reliability.

3. Transform each flow vector F into a corresponding capacity vector Y via the following equations:
$y_i=h_{ig_i}(c)$, where $c\in\{1, 2, \ldots, M_{ig_i}\}$ and $$h_{ig_i}(c-1) < \left\lceil w_1 \sum_{r_i \in P_j} f_j \right\rceil \leq h_{ig_i}(c),$$

for $i=1, 2, \ldots, n$, and
$y_i=h_{ig_i}(c_{ig_i})$, where $c\in\{1, 2, \ldots, M_{ig_i}\}$ and $$h_{ig_i}(c-1) < \left\lceil w_2 \sum_{r_i \in P_j} f_j \right\rceil \leq h_{ig_i}(c),$$

for $i=n+1, n+2, \ldots, n+q$.

4. Utilize the d-MP judgment algorithm to obtain all lower vectors d-MPs among the capacity vectors Y. The d-MP judgment algorithm is described as below.

4.1 $I=\emptyset$. (I is the stack which stores the index of each non-minimal vector in d-MP. Initially, I is empty.)

4.2 For i=1 to k & $i\notin I$. Wherein there are k capacity vectors in d-MP.

4.3 For j=i+1 to k, & $j\notin I$.

4.4 If $Y_j<Y_i$, then $Y_i$ is a non-minimal one in d-MP, $I=I\cup\{i\}$, and go to 4.7. Else if $Y_j\geq Y_i$, then $Y_j$ is a non-minimal one in d-MP, $I=I\cup\{j\}$.

4.5 Next j.

4.6 $Y_i$ is a d-MP.

4.7 Next i.

5. Suppose the capacity vectors $Y_1, Y_2, \ldots, Y_b$ are the lower vectors d-MPs. Evaluate $$R_d(G) = Pr\left\{\bigcup_{i=1}^{b}\{Y \mid Y \geq Y_i, Y \in U_G\}\right\}$$

by the RSDP algorithm as the program codes shown in Table 1.

TABLE 1

The program codes of the RSDP algorithm.

```
function NR = RSDP(Y₁, Y₂, ..., Yᵦ) //Input b capacity vectors
for i = 1 : b
    if i == 1
        NR = Pr(Y ≥ Yᵢ);
    else
        TempNR_1 = Pr(Y ≥ Yᵢ);
        if i == 2
            TempNR_2 = Pr(Y ≥ max(Y₁, Yᵢ)); //max(Y₁, Yᵢ) =
            (Y₁ ⊕ Yᵢ)
        else
            for j = 1 : i - 1
                Yⱼ = max(Yⱼ, Yᵢ); //max(Yⱼ, Yᵢ)= (Yⱼ, Yᵢ)
            end
            b = b - 1
            TempNR_2 = RSDP(Y1, Y2, ..., Yb); //Execute recursive
        procedure
        end
    end
    NR = NR + TempNR_1 - TempNR_2; //Return value
end
```

Step 4: If the count is equal to the generation number, i.e., count=λ, output an optimal solution. Else if count>λ, return the optimal solution of the λth generation and stop the algorithm. Or, else if count<λ, count=count+1 and go to step 5.

Step 5: Execute the roulette wheel selection to select two chromosomes.

Step 6: Execute the crossover operation based on the crossover probability β to exchange the two chromosomes.

Step 7: Execute the mutation operation based on the mutation probability γ to mutate the two chromosomes.

Step 8: Replace another two of the chromosomes in the original population by the two new chromosomes, wherein the two replaced chromosomes have two minimal network reliabilities in the original population.

Step 9: Evaluate the network reliability for the two new chromosomes and then go to step 3 for next chromosome.

The process of said GA algorithm includes the selection, the crossover, and the mutation. The invention utilizes the roulette wheel selection to select two chromosomes from the population. At first, two chromosomes, (2, 3, 3, 5, 2, 1, 4, 5) and (1, 2, 5, 6, 6, 3, 5, 2), are supposed to be selected from the population. The crossover is executed based on the crossover probability. As shown in Table 2, the stage of the crossover adopts the 1-point crossover, and a crossover point (φ) is firstly generated randomly and is supposed to be 4. Then, the two selected chromosomes, (2, 3, 3, 5, 2, 1, 4, 5) and (1, 2, 5, 6, 6, 3, 5, 2) as the parents of the first generation, exchange with each other to be (2, 3, 3, |6, 6, 3, 5, 2) and (1, 2, 5, |5, 2, 1, 4, 5) as the offspring of the first generation.

TABLE 2

The stage of the crossover.
φ = 4

| Parents of 1st generation | Offspring of 1st generation |
|---|---|
| (2, 3, 3, 5, 2, 1, 4, 5) | (2, 3, 3, |6, 6, 3, 5, 2) |
| (1, 2, 5, 6, 6, 3, 5, 2) | (1, 2, 5, |5, 2, 1, 4, 5) |

The mutation is executed based on the mutation probability as shown in Table 3. Let $\eta_i=(\eta_1, \eta_2, \ldots, \eta_{n+q})$ be a binary vector which is generated randomly. If $\eta_\pi=1$, the value of πth gene of the chromosome must become another value except for its original value. For example, the two chromosomes are the offspring of the first generation as the parents of the second generation, (2, 3, 3, 6, 6, 3, 5, 2) and (1, 2, 5, 5, 2, 1, 4, 5). η is supposed to be (0, 0, 0, 0, 1, 0, 0, 1) and then the two chromosomes become (2, 3, 3, 6, 1, 3, 5, 4), where $g_5 \in \{1, 2, \ldots, z_5\}$ but $g_5 \neq 6$ and $g_8 \in \{1, 2, \ldots, z_8\}$ but $g_8 \neq 2$; and (1, 2, 5, 5, 3, 1, 4, 6), where $g_5 \in \{1, 2, \ldots, z_5\}$ but $g_5 \neq 2$ and $g_8 \in \{1, 2, \ldots, z_8\}$ but $g_8 \neq 5$. The parents are transformed into the offspring of the second generation by the stage of the mutation.

TABLE 3

The stage of the mutation.
η = (0, 0, 0, 0, 1, 0, 0, 1)

| Parents of 2nd generation | Offspring of 2nd generation |
|---|---|
| (0, 0, 0, 0, 1, 0, 0, 1) | (0, 0, 0, 0, 1, 0, 0, 1) |
| (2, 3, 3, 6, 6, 3, 5, 2) | (1, 2, 5, 5, 2, 1, 4, 5) |
| (2, 3, 3, 6, 1, 3, 5, 4) | (1, 2, 5, 5, 3, 1, 4, 6) |

Figure 3:
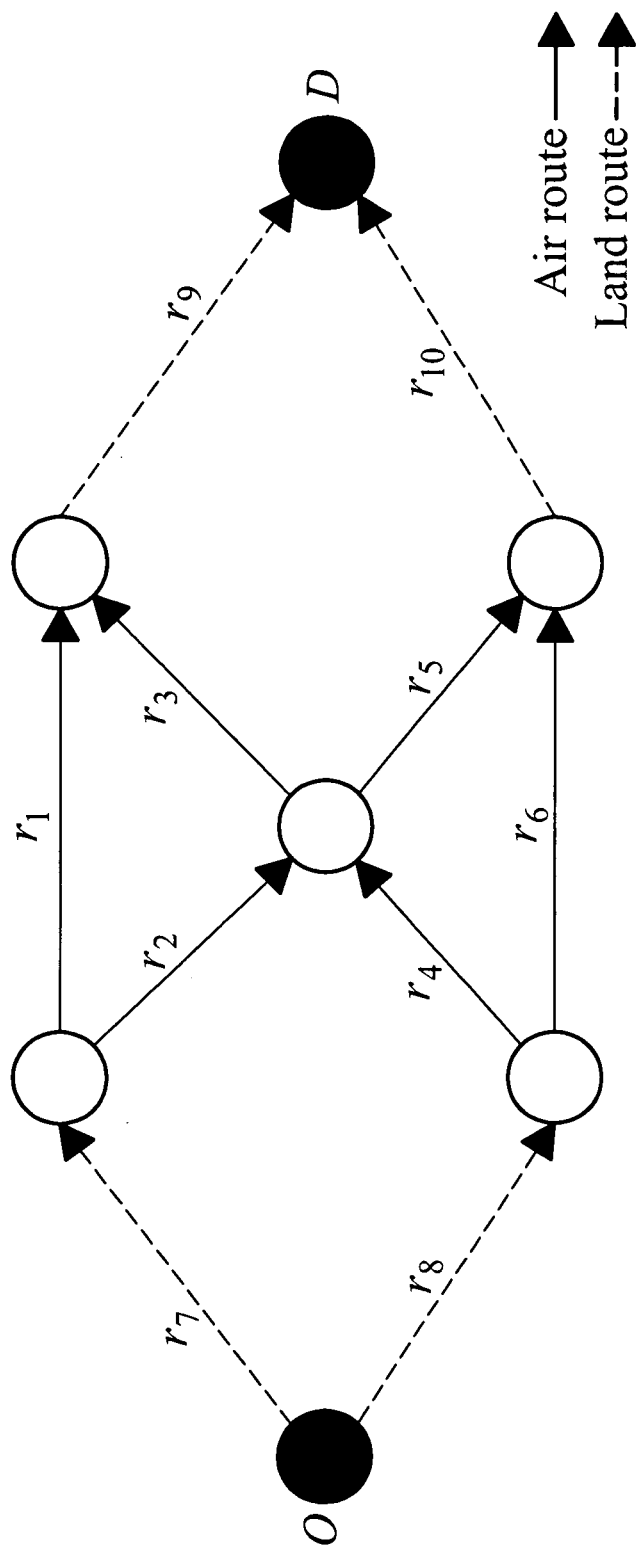
FIG. 3 is a schematic view of an first embodiment for the logistics network.

Refer to FIG. 3 for a schematic view of an first embodiment for the logistics network with 6 air routes and 4 land routes, where the solid lines denote the air routes, $r_1, r_2, r_3, r_4, r_5, r_6$, and the dashed lines denote the land route, $r_7, r_8, r_9, r_{10}$. The MPs composed of routes are $p_1=\{r_1, r_7, r_9\}$, $p_2=\{r_2, r_3, r_7, r_9\}$, $p_3=\{r_2, r_5, r_7, r_{10}\}$, $p_4=\{r_3, r_4, r_8, r_9\}$, $p_5=\{r_4, r_5, r_8, r_{10}\}$, and $p_6=\{r_6, r_8, r_{10}\}$. There are three carriers on each route. The available cargo capacities of three carriers on each air route and each land route are shown in Tables 4 and 5, respectively. Suppose one unit of demand consumes 10.5 tons and 2.5 TEU (Twenty-feet Equivalent Unit), i.e., $w_1=10.5$ and $w_2=2.5$. Considering various demand levels, the parameters of the genetic algorithm are defined as the population size α=30, the crossover probability β=0.95, the mutation probability γ=0.01, and the generation number λ=300. Otherwise, the genetic algorithm is compared with the implicit enumeration approach. The experimental results shown in Table 6 demonstrate that the genetic algorithm not only has better computational efficiency than the implicit enumeration approach, but also obtains the optimal solutions as d=1, d=2, d=4, and d=5 and an approximately optimal solution as d=3.

TABLE 4

The available cargo capacities of the carriers on the air routes in the first embodiment.

| Route | Carrier | Available cargo capacity (unit: tons) | | | | | | |
|---|---|---|---|---|---|---|---|---|
| ($r_i$) | ($\omega_{il}$) | 0 | 10 | 20 | 30 | 40 | 50 | 60 |
| $r_1$ | 1 | 0.01 | 0.05 | 0.01 | 0.01 | 0.92 | 0 | 0 |
| | 2 | 0.01 | 0.01 | 0.01 | 0.97 | 0 | 0 | 0 |
| | 3 | 0.05 | 0.05 | 0.01 | 0.05 | 0.84 | 0 | 0 |
| $r_2$ | 1 | 0.10 | 0.15 | 0.10 | 0.05 | 0.60 | 0 | 0 |
| | 2 | 0.01 | 0.05 | 0.01 | 0.93 | 0 | 0 | 0 |
| | 3 | 0.05 | 0.05 | 0.05 | 0.85 | 0 | 0 | 0 |
| $r_3$ | 1 | 0.01 | 0.05 | 0.01 | 0.01 | 0.01 | 0.01 | 0.9 |
| | 2 | 0.01 | 0.05 | 0.05 | 0.01 | 0.88 | 0 | 0 |
| | 3 | 0.10 | 0.10 | 0.05 | 0.10 | 0.65 | 0 | 0 |
| $r_4$ | 1 | 0.01 | 0.01 | 0.05 | 0.10 | 0.83 | 0 | 0 |
| | 2 | 0.10 | 0.15 | 0.10 | 0.05 | 0.60 | 0 | 0 |
| | 3 | 0.01 | 0.05 | 0.01 | 0.01 | 0.01 | 0.01 | 0.9 |
| $r_5$ | 1 | 0.01 | 0.01 | 0.05 | 0.93 | 0 | 0 | 0 |
| | 2 | 0.01 | 0.05 | 0.01 | 0.05 | 0.88 | 0 | 0 |
| | 3 | 0.10 | 0.15 | 0.10 | 0.05 | 0.60 | 0 | 0 |
| $r_6$ | 1 | 0.05 | 0.01 | 0.05 | 0.89 | 0 | 0 | 0 |
| | 2 | 0.10 | 0.15 | 0.10 | 0.05 | 0.60 | 0 | 0 |
| | 3 | 0.01 | 0.05 | 0.01 | 0.01 | 0.01 | 0.01 | 0.9 |

TABLE 5

The available cargo capacities of the carriers on the land routes in the first embodiment.

| Route ($r_i$) | Carrier ($\omega_{ij}$) | Available cargo capacity (unit: TEU) | | | | | | | | | |
|---|---|---|---|---|---|---|---|---|---|---|---|
| | | 0 | 1 | 2 | 3 | 4 | 5 | 6 | 7 | 8 | 9 |
| $r_7$ | 1 | 0.01 | 0.01 | 0.01 | 0.01 | 0.01 | 0.05 | 0.05 | 0.1 | 0.15 | 0.6 |
| | 2 | 0.01 | 0.01 | 0.01 | 0.02 | 0.05 | 0.9 | 0 | 0 | 0 | 0 |
| | 3 | 0.02 | 0.02 | 0.02 | 0.02 | 0.02 | 0.05 | 0.05 | 0.8 | 0 | 0 |
| $r_8$ | 1 | 0.05 | 0.05 | 0.05 | 0.05 | 0.05 | 00.5 | 0.05 | 0.65 | 0 | 0 |
| | 2 | 0.02 | 0.02 | 0.03 | 0.03 | 0.04 | 0.04 | 0.04 | 0.78 | 0 | 0 |
| | 3 | 0.01 | 0.02 | 0.03 | 0.04 | 0.05 | 0.1 | 0.75 | 0 | 0 | 0 |
| $r_9$ | 1 | 0.01 | 0.01 | 0.01 | 0.01 | 0.01 | 0.01 | 0.01 | 0.01 | 0.01 | 0.91 |
| | 2 | 0.02 | 0.02 | 0.03 | 0.03 | 0.05 | 0.05 | 0.1 | 0.1 | 0.6 | 0 |
| | 3 | 0.01 | 0.01 | 0.01 | 0.01 | 0.01 | 0.01 | 0.01 | 0.93 | 0 | 0 |
| $r_{10}$ | 1 | 0.01 | 0.01 | 0.01 | 0.01 | 0.96 | 0 | 0 | 0 | 0 | 0 |
| | 2 | 0.01 | 0.01 | 0.01 | 0.01 | 0.01 | 0.02 | 0.03 | 0.05 | 0.85 | 0 |
| | 3 | 0.02 | 0.02 | 0.03 | 0.03 | 0.05 | 0.05 | 0.8 | 0 | 0 | 0 |

TABLE 6

The results of comparing the implicit enumeration approach with GA.

| | Implicit enumeration approach | | | GA (30, 0.95, 0.01, 300)[a] | | |
|---|---|---|---|---|---|---|
| d | Maximal network reliability | Exact solution (# optimal solutions) | CPU time (s) | Maximal network reliability | Optimal solution | CPU time (s) |
| 1 | 0.99692 | (2, 2, 1, 1, 1, 1, 1, 3, 1, 1) (32 terms) | 70.859 | 0.99692 | (2, 2, 1, 1, 1, 1, 1, 3, 3, 2) | 1.219 |
| 2 | 0.99104 | (2, 2, 1, 1, 1, 3, 1, 2, 1, 2) (2 terms) | 403.625 | 0.99104 | (2, 2, 1, 1, 1, 3, 1, 2, 1, 2) | 8.125 |
| 3 | 0.93722 | (2, 2, 1, 1, 2, 3, 1, 3, 1, 2) (1 term) | 658.188 | 0.93598 | (1, 2, 1, 3, 2, 3, 1, 3, 1, 2) | 21.106 |
| 4 | 0.80739 | (2, 2, 1, 1, 1, 3, 1, 3, 1, 2) (1 term) | 406.875 | 0.80739 | (2, 2, 1, 1, 1, 3, 1, 3, 1, 2) | 13.968 |
| 5 | 0.55162 | (1, 1, 1, 1, 1, 3, 1, 2, 1, 2) (1 term) | 201.047 | 0.5516 | (1, 1, 1, 1, 1, 3, 1, 2, 1, 2) | 8.781 |
| 6 | 0 | ∅[b] | 181.359 | 0 | ∅[b] | 3.11 |

[a] GA ($\alpha$, $\beta$, $\gamma$, $\lambda$).
[b] No solution.

Figure 4:
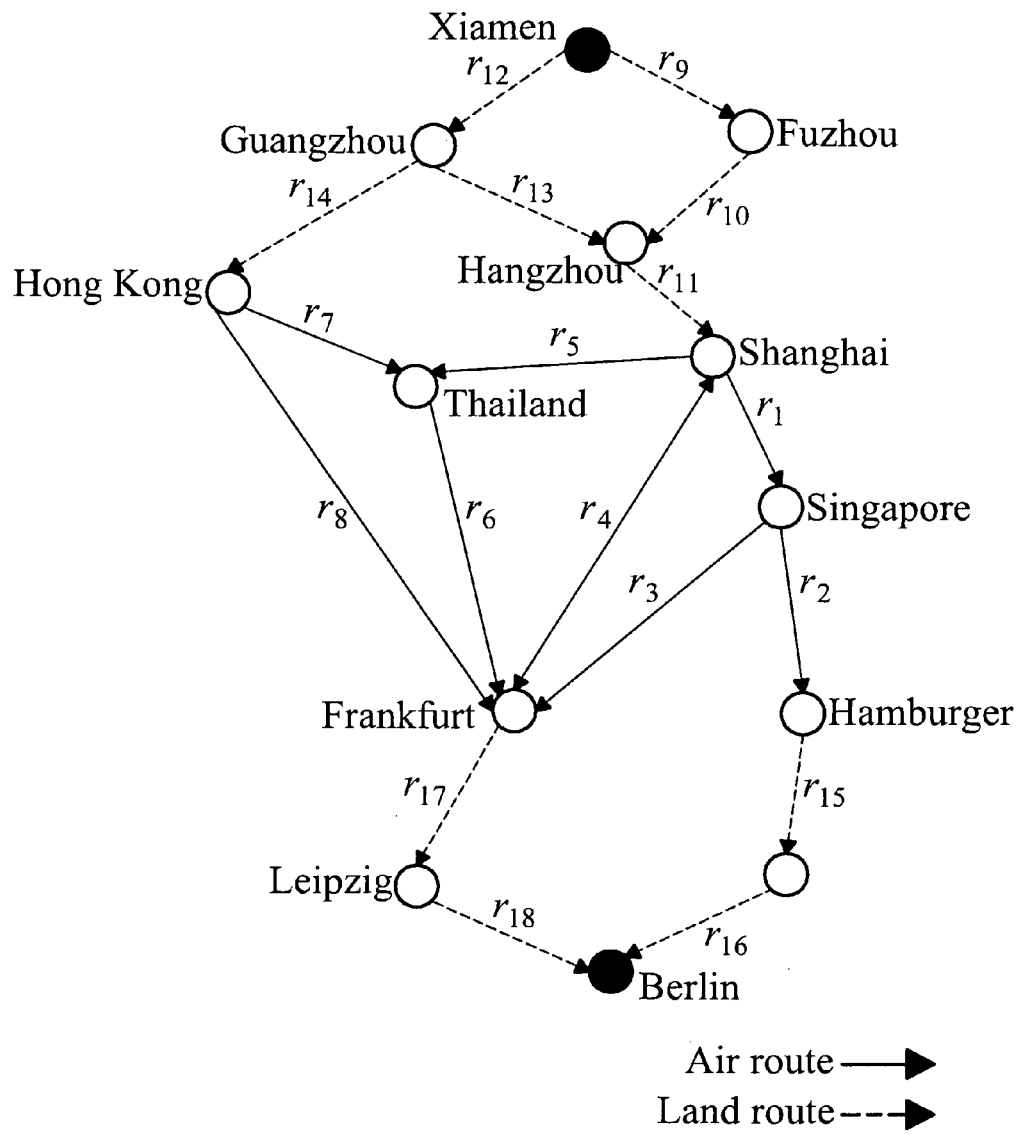
FIG. 4 is a schematic view of an second embodiment for transporting the LCD display panels from Xiamen, China to Berlin, Germany.

Refer to FIG. 4 for a schematic view of an second embodiment for the logistic network. The LCD display panels made by the manufacturer at Xiamen in China are transported to Berlin in Germany. The solid lines denote the air routes, $r_1$ to $r_8$, and the dashed lines denote the land lines, $r_9$ to $r_{18}$. The real cargo capacities of the carriers on the air routes and the land routes are shown in Tables 7 and 8, respectively. Each carrier provides several cargo capacities: 0, 10 tons, 20 tons, . . . , or 60 tons on one air route, and 0, 1 TEU, 2 TEU, . . . , or 9 TEU on one land route. The dimension of each 22" LCD monitor is 56.8×46.2×14.5 cm³ and its weight is approximately 6 kg. A TEU with the size, 589.8×235.2×238.5 cm³, can load approximately 880 pieces of 22" LCD monitors. In general, one unit of demand is counted in terms of 1,000 pieces. Thus, one unit of demand consumes approximately 6 tons and 1.15 TEU, i.e. $w_1=6$ and $w_2=1.15$.

TABLE 7

The available cargo capacities of the carriers on the air routes in the second embodiment.

| Route ($r_i$) | Carrier ($\omega_{ij}$) | Available cargo capacity (unit: tons) | | | | | | |
|---|---|---|---|---|---|---|---|---|
| | | 0 | 10 | 20 | 30 | 40 | 50 | 60 |
| $r_1$ | 1 | 0.012 | 0.017 | 0.041 | 0.93 | 0 | 0 | 0 |
| | 2 | 0.05 | 0.01 | 0.05 | 0.89 | 0 | 0 | 0 |
| | 3 | 0.01 | 0.05 | 0.01 | 0.01 | 0.01 | 0.01 | 0.9 |
| | 4 | 0.023 | 0.035 | 0.052 | 0.08 | 0.1 | 0.1 | 0.61 |
| | 5 | 0.1 | 0.1 | 0.12 | 0.13 | 0.55 | 0 | 0 |
| $r_2$ | 1 | 0.01 | 0.01 | 0.01 | 0.02 | 0.015 | 0.015 | 0.92 |
| | 2 | 0.01 | 0.035 | 0.065 | 0.1 | 0.79 | 0 | 0 |
| | 3 | 0.024 | 0.033 | 0.14 | 0.803 | 0 | 0 | 0 |
| | 4 | 0.05 | 0.05 | 0.1 | 0.15 | 0.65 | 0 | 0 |
| | 5 | 0.014 | 0.014 | 0.02 | 0.031 | 0.921 | 0 | 0 |
| $r_3$ | 1 | 0.01 | 0.04 | 0.06 | 0.12 | 0.77 | 0 | 0 |
| | 2 | 0.003 | 0.011 | 0.011 | 0.97 | 0 | 0 | 0 |
| | 3 | 0.036 | 0.042 | 0.023 | 0.059 | 0.84 | 0 | 0 |
| | 4 | 0.02 | 0.025 | 0.028 | 0.033 | 0.044 | 0.05 | 0.8 |
| $r_4$ | 1 | 0.012 | 0.012 | 0.14 | 0.17 | 0.666 | 0 | 0 |
| | 2 | 0.053 | 0.055 | 0.062 | 0.08 | 0.07 | 0.68 | 0 |
| | 3 | 0.028 | 0.032 | 0.94 | 0 | 0 | 0 | 0 |
| | 4 | 0.016 | 0.022 | 0.123 | 0.839 | 0 | 0 | 0 |
| $r_5$ | 1 | 0.01 | 0.04 | 0.06 | 0.12 | 0.77 | 0 | 0 |
| | 2 | 0.003 | 0.011 | 0.011 | 0.97 | 0 | 0 | 0 |
| | 3 | 0.016 | 0.042 | 0.023 | 0.059 | 0.84 | 0 | 0 |

TABLE 7-continued

The available cargo capacities of the carriers on the air routes in the second embodiment.

| Route ($r_i$) | Carrier ($\omega_{il}$) | Available cargo capacity (unit: tons) | | | | | | |
|---|---|---|---|---|---|---|---|---|
| | | 0 | 10 | 20 | 30 | 40 | 50 | 60 |
| $r_6$ | 1 | 0.01 | 0.01 | 0.05 | 0.93 | 0 | 0 | 0 |
| | 2 | 0.03 | 0.05 | 0.16 | 0.76 | 0 | 0 | 0 |
| | 3 | 0.05 | 0.05 | 0.05 | 0.85 | 0 | 0 | 0 |
| | 4 | 0.01 | 0.01 | 0.07 | 0.075 | 0.17 | 0.665 | 0 |
| $r_7$ | 1 | 0.085 | 0.09 | 0.114 | 0.711 | 0 | 0 | 0 |
| | 2 | 0.01 | 0.05 | 0.94 | 0 | 0 | 0 | 0 |
| | 3 | 0.01 | 0.01 | 0.05 | 0.1 | 0.83 | 0 | 0 |
| | 4 | 0.01 | 0.034 | 0.058 | 0.11 | 0.788 | 0 | 0 |
| $r_8$ | 1 | 0.085 | 0.09 | 0.114 | 0.711 | 0 | 0 | 0 |
| | 2 | 0.01 | 0.01 | 0.05 | 0.1 | 0.83 | 0 | 0 |
| | 3 | 0.01 | 0.034 | 0.058 | 0.11 | 0.788 | 0 | 0 |

TABLE 8

The available cargo capacities of the carriers on the land routes in the second embodiment.

| Route ($r_i$) | Carrier ($\omega_{il}$) | Available cargo capacity (unit: TEU) | | | | | | | | | |
|---|---|---|---|---|---|---|---|---|---|---|---|
| | | 0 | 1 | 2 | 3 | 4 | 5 | 6 | 7 | 8 | 9 |
| $r_9$ | 1 | 0.003 | 0.006 | 0.014 | 0.013 | 0.02 | 0.07 | 0.085 | 0.1 | 0.15 | 0.539 |
| | 2 | 0.006 | 0.006 | 0.012 | 0.013 | 0.018 | 0.022 | 0.035 | 0.888 | 0 | 0 |
| | 3 | 0.001 | 0.007 | 0.011 | 0.014 | 0.025 | 0.13 | 0.19 | 0.622 | 0 | 0 |
| | 4 | 0.01 | 0.015 | 0.015 | 0.017 | 0.02 | 0.063 | 0.07 | 0.79 | 0 | 0 |
| $r_{10}$ | 1 | 0.002 | 0.002 | 0.014 | 0.015 | 0.16 | 0.807 | 0 | 0 | 0 | 0 |
| | 2 | 0.01 | 0.014 | 0.017 | 0.02 | 0.117 | 0.156 | 0.666 | 0 | 0 | 0 |
| | 3 | 0.009 | 0.011 | 0.014 | 0.017 | 0.059 | 0.095 | 0.155 | 0.64 | 0 | 0 |
| | 4 | 0.01 | 0.01 | 0.01 | 0.01 | 0.01 | 0.01 | 0.01 | 0.01 | 0.01 | 0.91 |
| | 5 | 0.01 | 0.02 | 0.03 | 0.04 | 0.05 | 0.1 | 0.75 | 0 | 0 | 0 |
| $r_{11}$ | 1 | 0.004 | 0.008 | 0.009 | 0.011 | 0.012 | 0.02 | 0.03 | 0.045 | 0.8610 | |
| | 2 | 0.01 | 0.01 | 0.025 | 0.03 | 0.03 | 0.03 | 50.04 | 0.05 | 0.77 | 0 |
| | 3 | 0.001 | 0.006 | 0.007 | 0.009 | 0.01 | 0.013 | 0.015 | 0.017 | 0.025 | 0.897 |
| | 4 | 0.001 | 0.001 | 0.005 | 0.01 | 0.011 | 0.012 | 0.013 | 0.015 | 0.017 | 0.915 |
| | 5 | 0.001 | 0.001 | 0.001 | 0.002 | 0.01 | 0.015 | 0.02 | 0.05 | 0.9 | 0 |
| | 6 | 0.002 | 0.006 | 0.012 | 0.013 | 0.018 | 0.022 | 0.027 | 0.9 | 0 | 0 |
| | 7 | 0.002 | 0.006 | 0.053 | 0.07 | 0.08 | 0.13 | 0.659 | 0 | 0 | 0 |
| $r_{12}$ | 1 | 0.003 | 0.007 | 0.01 | 0.02 | 0.96 | 0 | 0 | 0 | 0 | 0 |
| | 2 | 0.007 | 0.008 | 0.009 | 0.01 | 0.01 | 0.02 | 0.03 | 0.05 | 0.856 | 0 |
| | 3 | 0.001 | 0.006 | 0.08 | 0.01 | 0.015 | 0.02 | 0.021 | 0.023 | 0.024 | 0.8 |
| | 4 | 0.006 | 0.006 | 0.07 | 0.009 | 0.035 | 0.055 | 0.07 | 0.749 | 0 | 0 |
| $r_{13}$ | 1 | 0.005 | 0.008 | 0.016 | 0.971 | 0 | 0 | 0 | 0 | 0 | 0 |
| | 2 | 0.001 | 0.007 | 0.011 | 0.014 | 0.025 | 0.13 | 0.19 | 0.622 | 0 | 0 |
| | 3 | 0.003 | 0.003 | 0.009 | 0.01 | 0.019 | 0.068 | 0.087 | 0.801 | 0 | 0 |
| | 4 | 0.02 | 0.02 | 0.03 | 0.03 | 0.05 | 0.05 | 0.8 | 0 | 0 | 0 |
| $r_{14}$ | 1 | 0.002 | 0.022 | 0.043 | 0.05 | 0.067 | 0.1 | 0.116 | 0.6 | 0 | 0 |
| | 2 | 0.001 | 0.003 | 0.008 | 0.017 | 0.029 | 0.068 | 0.087 | 0.787 | 0 | 0 |
| | 3 | 0.001 | 0.001 | 0.005 | 0.005 | 0.013 | 0.017 | 0.021 | 0.037 | 0.9 | 0 |
| $r_{15}$ | 1 | 0.01 | 0.011 | 0.014 | 0.015 | 0.95 | 0 | 0 | 0 | 0 | 0 |
| | 2 | 0.004 | 0.011 | 0.014 | 0.017 | 0.059 | 0.095 | 0.155 | 0.645 | 0 | 0 |
| | 3 | 0.007 | 0.009 | 0.01 | 0.012 | 0.013 | 0.02 | 0.03 | 0.15 | 0.7490 | |
| $r_{16}$ | 1 | 0.001 | 0.001 | 0.06 | 0.08 | 0.12 | 0.738 | 0 | 0 | 0 | 0 |
| | 2 | 0.005 | 0.005 | 0.015 | 0.015 | 0.02 | 0.02 | 0.03 | 0.15 | 0.74 | 0 |
| | 3 | 0.003 | 0.005 | 0.01 | 0.01 | 0.07 | 0.1 | 0.15 | 0.148 | 0.504 | 0 |
| | 4 | 0.001 | 0.006 | 0.01 | 0.014 | 0.025 | 0.03 | 0.19 | 0.724 | 0 | 0 |
| | 5 | 0.01 | 0.01 | 0.02 | 0.04 | 0.05 | 0.05 | 0.82 | 0 | 0 | 0 |
| $r_{17}$ | 1 | 0.01 | 0.01 | 0.01 | 0.01 | 0.07 | 0.08 | 0.81 | 0 | 0 | 0 |
| | 2 | 0.009 | 0.011 | 0.095 | 0.014 | 0.017 | 0.059 | 0.155 | 0.64 | 0 | 0 |
| | 3 | 0.003 | 0.006 | 0.013 | 0.014 | 0.02 | 0.07 | 0.085 | 0.1 | 0.15 | 0.539 |
| | 4 | 0.003 | 0.006 | 0.007 | 0.009 | 0.01 | 0.013 | 0.015 | 0.017 | 0.025 | 0.895 |
| | 5 | 0.003 | 0.003 | 0.009 | 0.01 | 0.019 | 0.068 | 0.087 | 0.801 | 0 | 0 |
| | 6 | 0.002 | 0.007 | 0.01 | 0.03 | 0.051 | 0.08 | 0.82 | 0 | 0 | 0 |
| $r_{18}$ | 1 | 0.004 | 0.005 | 0.009 | 0.01 | 0.015 | 0.07 | 0.08 | 0.13 | 0.15 | 0.527 |
| | 2 | 0.001 | 0.001 | 0.02 | 0.02 | 0.062 | 0.078 | 0.011 | 0.016 | 0.791 | 0 |
| | 3 | 0.002 | 0.008 | 0.014 | 0.017 | 0.059 | 0.095 | 0.155 | 0.65 | 0 | 0 |
| | 4 | 0.003 | 0.006 | 0.01 | 0.013 | 0.02 | 0.06 | 0.075 | 0.13 | 0.15 | 0.533 |
| | 5 | 0.002 | 0.003 | 0.011 | 0.014 | 0.025 | 0.05 | 0.06 | 0.07 | 0.765 | 0 |
| | 6 | 0.002 | 0.005 | 0.008 | 0.017 | 0.049 | 0.068 | 0.087 | 0.764 | 0 | 0 |

Figure 5:
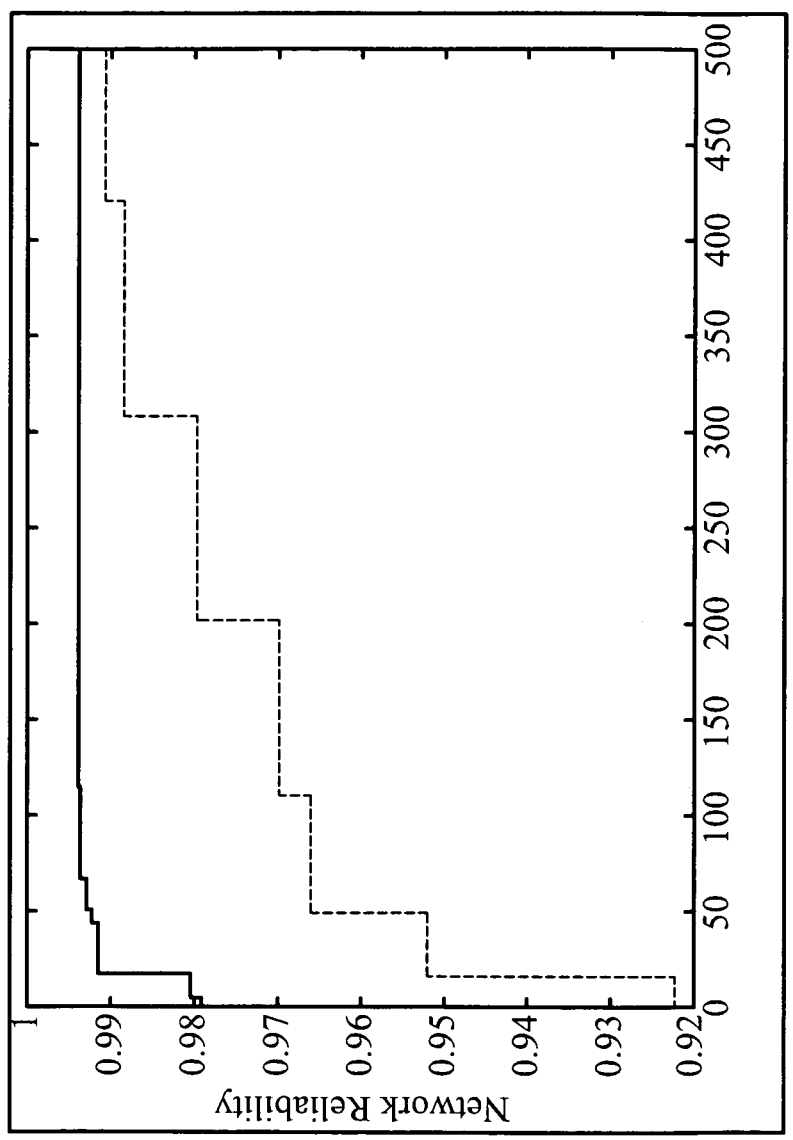
FIG. 5 is a schematic view of the comparison between the genetic algorithm and the random search.

Suppose the demand of 22" LCD monitors at Berlin are 2,000 pieces, i.e., d=2. The genetic algorithm with $\alpha$=60, $\beta$=0.6, $\gamma$=0.005, and $\lambda$=500 is compared with the random search approach by searching for 500 random solutions. The experimental results are illustrated in FIG. 5, where the solid line denotes the result of the genetic algorithm and the dashed line denotes the result of the random search approach. Obviously, the maximal network reliability obtained from the genetic algorithm is better than the random search approach. The optimal carrier selection from the genetic algorithm is (1, 1, 2, 1, 1, 4, 1, 2, 1, 5, 1, 3, 3, 1, 3, 5, 6) with the maximal network reliability 0.9936837 that is found at 115th generation.

Above all, many enterprises expend their overseas markets and implement outsourcing of logistics activities to external carriers with the growth of globalization. The invention provides a carrier selection method to offer the stabilization of the freight delivery and to increase the performance index.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A carrier selection method for a logistics network, the logistics network comprising a plurality of nodes and a plurality of minimal paths, wherein the nodes include a start and a terminal, and the minimal paths extend from the start to the terminal of respective said nodes, each of the minimal paths being formed by a plurality of routes without a loop, and each of the routes extending between two of the nodes, said method comprising the steps of:

utilizing a computer to execute carrier selection software having a virtual network that simulates a logistics network, the computer including an input unit, an operating unit and an output unit;

providing a plurality of carriers in the logistics network;

choosing one of the carriers for each routes in the logistics network to form one carrier set, so as to generate a plurality of carrier sets;

the input unit receiving a demand for transport from the start to the terminal in the logistics network by a user input to the carrier selection software;

defining the demand distributed among and transmitted through the minimal paths;

defining each of the carriers as having a plurality of cargo capacities and a maximal capacity;

defining a flow vector having a flow of each of minimal paths so that each of the routes has a traveled flow, wherein the sum of the flows of the minimal paths is equal to the demand;

the operating unit selecting the flow vector for satisfying a first constraint, wherein the first constraint is defined that the flow of each of minimal paths is smaller than or equal to the maximal capacity;

the operating unit transforming each of the flow vectors satisfying the first constraint into a corresponding capacity vector, wherein the corresponding capacity vector has a needed capacity of each of the routes;

the operating unit selecting the capacity vector for satisfying a second constraint, wherein the second constraint is defined that the needed capacity is equal to a minimal cargo capacity among the cargo capacities of the carriers, wherein the cargo capacities of the carriers are more than or equal to the traveled flow for each of the routes, so that the capacity vector satisfying the second constraint is defined as a lower vector;

the operating unit calculating a probability that each of the capacity vectors is larger than or equal to the lower vector, and defining the probability as the network reliability;

the operating unit executing a genetic algorithm with the carrier sets as chromosomes in the genetic algorithm to search for an optimal carrier set among the carrier sets, wherein the optimal carrier set has a maximal network reliability; and displaying the optimal carrier set on the output unit.

2. The carrier selection method for logistics network of claim 1, wherein the step of the operating unit calculating the network reliability is performed by a minimal path algorithm cooperating with a recursive sum of disjoint products.

3. The carrier selection method for logistics network of claim 1, wherein the step of the operating unit executing the genetic algorithm comprises:

defining an initial parameter including a population, a count and a generation number, wherein the population includes a plurality of chromosomes, and each of the chromosomes represents each of the carrier sets;

outputting an optimal solution when the count equaling to the generation number; and defining the optimal solution as the optimal carrier set.

4. The carrier selection method for logistics network of claim 3, further comprising: adding one to the count when executing the genetic algorithm every time.

5. The carrier selection method for logistics network of claim 1, wherein the step of the operating unit executing the genetic algorithm comprises:

defining an initial parameter including a population, a crossover probability, a mutation probability, a count and a generation number, wherein the population includes a plurality of chromosomes, each of the chromosomes represents one of the carrier sets;

adding one to the count when the count smaller than the generation number;

executing a roulette wheel selection to select two of the chromosomes;

executing a crossover operation based on the crossover probability to exchange the two chromosomes;

executing a mutation operation based on the mutation probability to transform the two chromosomes into two new chromosomes;

replacing another two of the chromosomes by the two new chromosomes, wherein the replaced two of the chromosomes have two minimal network reliabilities among the network reliabilities;

evaluating the network reliabilities for the two new chromosomes;

executing the genetic algorithm again;

until the count equaling to the generation number, outputting an optimal solution; and defining the optimal solution as the optimal carrier set.

6. The carrier selection method for logistics network of claim 5, further comprising: adding one to the count when executing the genetic algorithm every time.

* * * * *